G. H. HAMM.
CALKING TOOL.
APPLICATION FILED JAN. 14, 1919.
1,336,295.
Patented Apr. 6, 1920.
2 SHEETS—SHEET 2.
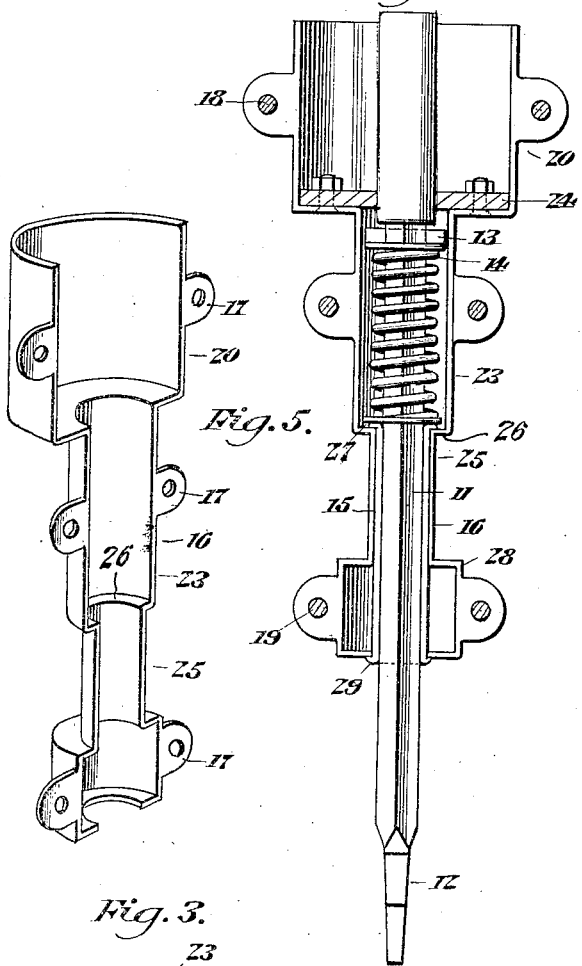
Witnesses
Inventor
George H. Hamm
By Victor J. Evans
Attorney

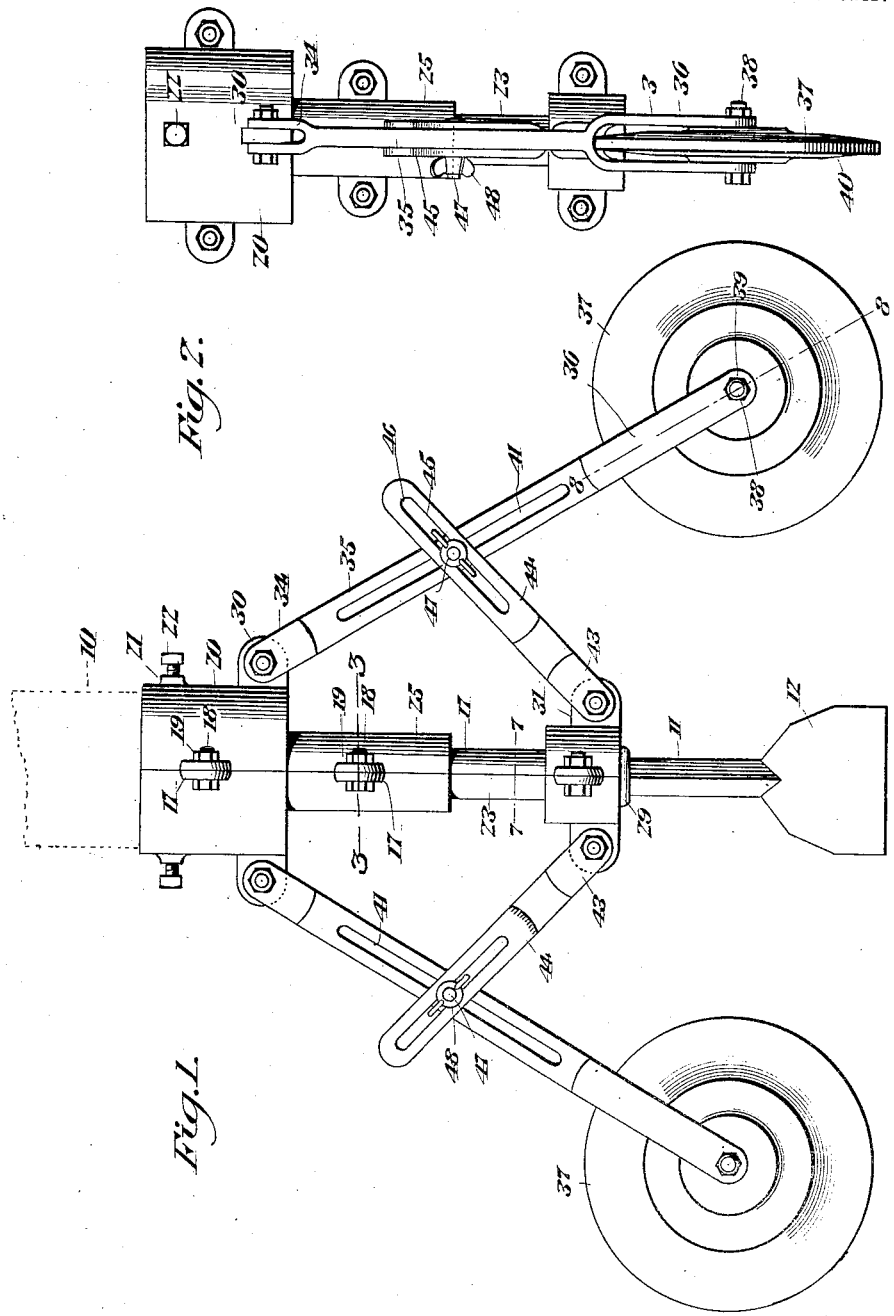

UNITED STATES PATENT OFFICE.

GEORGE H. HAMM, OF ATHENS, NEW YORK.

CALKING-TOOL.

1,336,295.  Specification of Letters Patent.  Patented Apr. 6, 1920.

Application filed January 14, 1919. Serial No. 271,012.

*To all whom it may concern:*

Be it known that I, GEORGE H. HAMM, a citizen of the United States, residing at Athens, in the county of Greene and State of New York, have invented new and useful Improvements in Calking-Tools, of which the following is a specification.

This invention has reference to a mechanical means for calking seams, particularly wooden ship seams.

The present hand operated means for calking seams is both slow and laborious, and the calking is frequently rendered irregular by blows by a hammer on the calking tool being imparted with different degrees of force.

It is the object of the present invention to produce a motor operated calking device whereby the impact or degree of force delivered to the calking tool may be regulated to a nicety, and wherein the calking operation may be performed in an easier, quicker and better manner than by the ordinary process.

It is a still further object of the invention to produce a motor operated calking apparatus having means wherein the seams are properly spread to receive the calking iron and thereafter the calking material is smoothed in the seams by an additional means, all of such means being operative regardless of the direction in which the tool is moved.

Other objects and advantages of the improvement will appear as the nature thereof is more fully understood, reference being had to the accompanying drawings, in which—

Figure 1 is a side elevation illustrating the improvement and the motor attached thereto;

Fig. 2 is an end elevation;

Fig. 3 is a transverse sectional view approximately on the line 3—3 of Fig. 1.

Fig. 4 is a transverse vertical sectional view approximately on the line 4—4 of Fig. 3;

Fig. 5 is a perspective view of one of the sections of the stock or casing for the calking tool;

Fig. 6 is a similar view of one section of the removable bushing for the shank of the calking tool;

Fig. 7 is a sectional view approximately on the line 7—7 of Fig. 1; and

Fig. 8 is a sectional view approximately on the line 8—8 of Fig. 1.

The motive power for operating the calking tool, illustrated by the drawings, is in the nature of a pneumatic hammer and is generally designated by the numeral 10. The hammer is adapted to impart blows, at determined intervals to the outer end of the shank 11 of a calking tool 12. The shank 11 is substantially square in cross section, and the calking tool may be of any ordinary or preferred construction.

The shank, at a suitable distance from its upper end is provided with one or more transverse openings which receive therethrough a pin 13, and this pin provides a contact member for one end of a helical spring 14, the opposite end of the spring resting on one end of a split bronze bushing 15, the said bushing having its bore of square formation to snugly engage the square shank of the tool 12.

The shank of the tool, as well as the bushing 15 is received in the stock or barrel portion 16 of my improvement.

As disclosed by the drawings, the stock 16 is constructed of two similar sections having, at spaced intervals, upon their confronting edges outstanding lugs 17, and passing through suitable openings in these lugs are the shanks of bolts 18, the said bolts being engaged by nuts 19 which contacting with one of the lugs hold the sections of the stock together. The upper or outer end of the stock is enlarged as indicated by the numeral 20, and this enlarged portion is preferably cylindrical in cross section and has, adjacent the outer edge thereof diametrically opposed enlargements in the nature of bosses 21, the same having threaded openings, and the threads of these openings are engaged by binding screws or bolts 22 which contacting with the casing of the hammer 10 hold the said hammer connected with the stock and in a position to contact with the upper or outer end of the shank 11 of the tool 12. The stock, from the upper enlarged portion thereof which I have termed the head is formed with a barrel 23, a suitable guide plate 24 being disposed on the shoulder between the head 20 and the barrel 23 and being secured on the said shoulder in any desired or preferred manner. The guide plate is centrally provided with an opening for the shank of the calking tool, and the pin 13 is disposed in the barrel below the guide plate 24, which latter, it should be stated, is removably connected to the stock. The barrel 23 is provided with a reduced extension indicated by the numeral 25, and on the shoulder 26 between the extension 25 and the barrel 23 rest the outwardly flanged ends 27 of the sections of the bushing 15. The barrel at the lower or inner end thereof is further preferably enlarged as at 28, but the outer wall of this barrel is provided with a reduced opening through which passes the bushing 15 and the outer end of the said bushing is flanged as at 29 and this flange rests on the outer wall of the enlargement 28. By this arrangement it will be noted that the bushing is effectively retained in the barrel of the stock and likewise that the hammer 10 is removably secured in the head of the stock. The spring 14 normally moves the tool 12 upwardly of the stock in a position to have the end of its shank contacted by the hammer and thus forced outwardly against the pressure of the spring 14.

On the head 24, at diametrically opposite points, and preferably below the bosses 21 are outwardly extending ears 30. On the opposite sides of the enlarged lower end 28 of the barrel of the stock, are formed outwardly extending ears 31. Removably pivotally connected with the ears 30 are the upper bifurcated ends 34 of bars 35. The lower or outer ends of these bars 35 are also bifurcated as indicated by the numerals 36. Between the arms provided by the bifurcated portions 36 of each of the bars 35 are arranged wheels 37 which are journaled on suitable removable shafts 38 carried by the arms 36. The wheels 37 preferably have their central portions provided with widened hubs 39 and have their sides, at a suitable distance from the said hubs 39 flared inwardly toward the periphery of the wheels, as indicated by the numerals 40. The outer portions of the wheels are thus substantially wedge-shaped in cross section, so that the same may be readily received in the seams to be calked.

The bars 35 are provided each with an elongated slot 41.

Pivotally, but removably secured to each of the arms 31, are the inner bifurcated ends 43 of links 44. The outer ends of these links are likewise bifurcated providing spaced arms 45 which receive therebetween the respective bars 35. The arms 45 are provided with elongated alining slots 46.

Passing through the registering slots 46 in the arms 45 of the links 44 and the slots 41 of the respective bars 35 are the threaded shanks of headed members 47. These shanks are engaged by wing nuts 48 which are adapted to contract with one of the arms 45 to compress the arms against the opposite faces of the bars 35, and consequently adjust and hold the wheels 37 adjusted with respect to each other and with respect to the stock 16.

It is believed the simplicity of the construction, the advantages thereof and the method of operation will be apparent to those skilled in the art to which such invention appertains. The stock or barrel is gripped by one hand of the operator. The wheels are guided in the seam to be calked. The calking material is arranged in the said seam. Power is applied to the motor, which in this instance is the pneumatic hammer to force the tool 12 to operate on the calking material. The forward wheel 37 opens the seam. The rear wheel 37 smooths the calked material. The wheels being adjustable toward or away from each other, regulate the stroke of the calking tool, and the elements comprising the improvement are detachable and interchangeable.

Having thus described the invention, what is claimed as new, is:—

1. In a device for the purpose set forth, a reciprocatory calking tool spring influenced in one direction and having motor means for actuating the same in another direction against the influence of said spring means, wheels arranged to the opposite sides of the tool, supports therefor, and adjusting means associated with said supports whereby to bring the wheels toward or away from each other to regulate the length of stroke of the calking tool.

2. In a device for the purpose set forth, a hollow stock, a calking tool reciprocatory thereto, spring means for influencing the tool inward of the stock, motor driven means for actuating the tool in an opposite direction, means for securing such motor actuating means to the stock, wheels arranged on the opposite sides of the calking tool, pivotal means connecting said wheels to the stock, and pivoted means also connected to the stock and adjustably associated with said last mentioned means.

3. In a device for the purpose set forth, a stock comprising a two-piece casing, means for connecting the sections thereof, a bushing in the casing and projecting through one end thereof, a calking tool having its shank arranged in the casing and engaging with the bushing, a guide plate for said shank connected to the sections of the stock, adjustable spring means between the shank and stock for influencing the tool in one direction, a fluid operated motor for moving the tool in an opposite direction, means on the stock for securing the motor thereto, wheels arranged at the opposite sides of the tool, pivoted members connected to the stock and supporting the wheels, brace members pivotally connected to the stock and adjustably associated with the supporting means for the wheels.

4. In a device for the purpose set forth, a hollow stock comprising two connected sections including a head and a barrel, a sectional bushing having a square bore seated in the barrel, a guide plate, a calking tool having a squared slotted shank received in the bushing and guide plate, a pin passing through the slot in the shank, a spring between the bushing and pin, motor means for moving the shank against the influence of the spring, retaining means for said motor means, wheels arranged at the opposite ends of the calking tool and having their sides flared outwardly from their treads, slotted bars having bifurcated portions pivoted to the stock and receiving the wheels, shafts for said wheels, slotted bifurcated links pivoted to the barrel and receiving the respective bars, and binding elements passing through the alining slots in the links and bars, whereby to adjustably support the wheels on the stock.

In testimony whereof I affix my signature.

GEORGE H. HAMM.